Oct. 6, 1953 — P. E. HEAL — 2,654,168
ADVERTISING DISPLAY DEVICE FOR TIRES
Filed Feb. 11, 1950

INVENTOR.
PAUL E. HEAL
BY
ATTORNEY

Patented Oct. 6, 1953

2,654,168

UNITED STATES PATENT OFFICE 2,654,168

ADVERTISING DISPLAY DEVICE FOR TIRES

Paul E. Heal, Chicago, Ill., assignor to The Pure Oil Company, Chicago, Ill., a corporation of Ohio Application February 11, 1950, Serial No. 143,777

2 Claims. (Cl. 40—2)

1

This invention relates to an advertising display device for attachment to tires offered for sale.

In promoting the sale of tires to the motoring public, it is recognized that there is a large segment of the market which is interested in many of the technical structural features of the tires, and appreciate the offering of educational material concerning those features in connection with the sale, so that a sound comparison of the virtues of one tire, its treads and carcass construction can be compared with another. However, due to the size and shape of the article, it has always been difficult to offer such material in convenient brief form available to a prospective purchaser on the spot.

It is, accordingly, a fundamental object of the instant invention to provide an advertising display device for use with automobile tires which is simple in construction and can be conveniently attached to a tire to point out briefly but emphatically the virtues of the several parts of the construction.

It is another object of the invention to provide a display device which can form an element of a package for the tire so that when oriented properly on the tire tread, it will point to and explain the virtues of various construction features thereof.

Other objects and advantages of the invention will in part be obvious and in part appear hereinafter from the following specification in conjunction with the accompanying drawing.

The invention, accordingly, comprises a display device formed from a flat sheet having portions thereof cut out to form indicators which, when oriented on a tire and attached thereto, serves to point to the several features of construction of the tire to tie the technical sales message with the particular tread or construction feature associated with one of the indicators. The invention, therefore, comprises the device embodying the features of construction, combination of elements and arrangement of parts hereinafter to be described in greater detail.

In the accompanying drawing, several embodiments of the invention are shown and inasmuch as all have the feature in common of being made of relatively light cardboard of about the weight of two or three-ply pasteboard, only a single view of each in the flat form is shown, and two views are added to illustrate the method of mounting the device on a tire.

Figure 1 represents a first form of the invention wherein the indicators extend into the tire display area;

2

Figure 1:
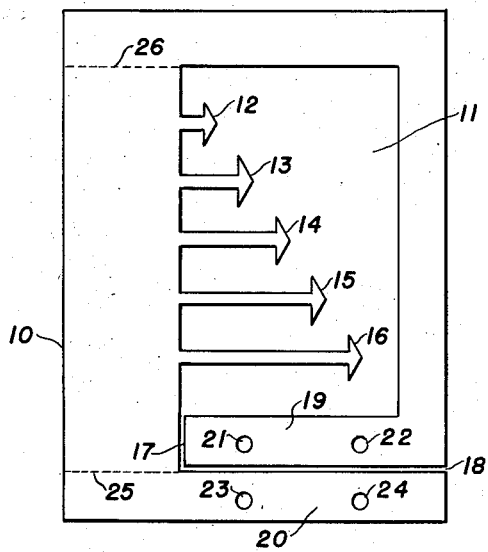

Referring back to Figure 1, the device comprises a body piece 10, having a section 11 thereof cut out into which project indicators in the form of arrows 12, 13, 14, 15 and 16, the opening being large enough to frame a section of tire tread. At the lower end of the device, 17 and 18 represent cuts in the sheet which make it open to have a pair of ends 19 and 20. By causing the piece 20 to register with the piece 19 formed by the cuts 17 and 18 so that index points 21 and 22, 23 and 24 register, and fastening the two pieces together by means of clips, staples, or otherwise, it will be observed that three sides of the body piece will remain flat and the fourth long side, between weakened lines 25 and 26, carrying the indicators will be bent into the form of an arc. Proper placement of the cut edge 18 will alter the radius of the arc so that its curvature can be made to match substantially any tire.

Figure 2:
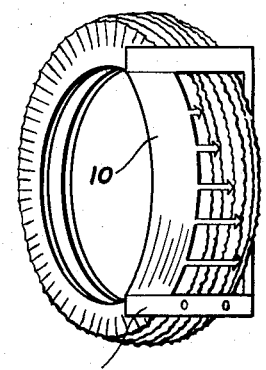
Figure 2 illustrates the manner of placement of the said device on a tire.

Figure 2 shows the device in use and it will be seen that it forms a three-sided frame around a section of the tire treads, the fourth side carrying the indicators forms an arcuate band for the printing of messages corresponding to the several indicators which point to the various treads on a tire surface.

Figure 3:
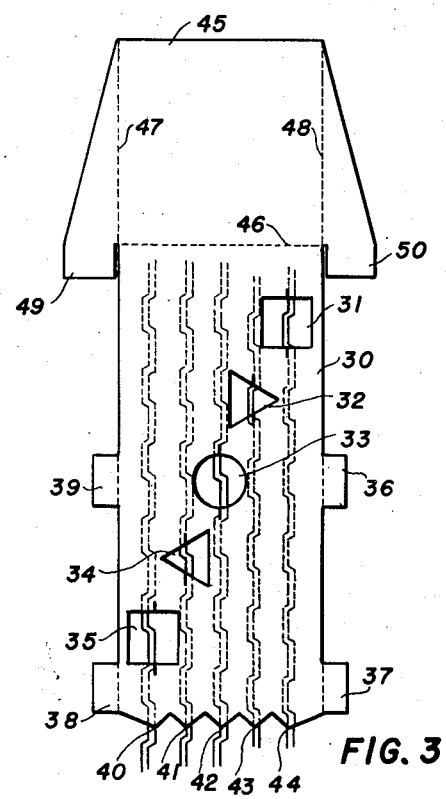
Figure 3 illustrates a second form of the invention pointing out a modified version, wherein the indicators not only point to but display the particular feature to be described.

Figure 3 represents another embodiment of the invention which takes the form of a single essentially rectangular shaped piece 30, having indicators 31, 32, 33, 34, and 35 in the form of openings therein, each of the openings being placed to register with a particular tread and optionally carrying an extra index to point it out should it be made larger than that necessary to display a single thread. The body of the piece carries tabs 36, 37, 38, and 39 on either side which are folded downward to aid in mounting the piece. The lower edge can be serrated symmetrically if desired, or in an appropriate fashion again to provide indicators 40, 41, 42, 43, and 44 to identify specific treads on the tire. At the upper edge of the piece, there is carried a display head 45 formed by extending the piece and providing it with weakened lines 46, 47 and 48 to permit bending it into an upright position so that tabs 49 and 50 attached thereto can extend into tire treads to maintain it in elevated position.

Figure 4:
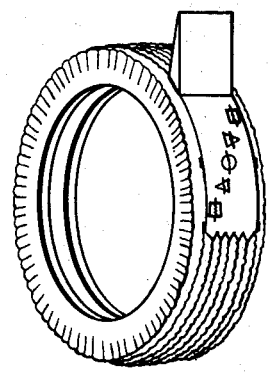
Figure 4 illustrates the second form of the invention in use on a tire.

In use, the device is mounted on a tire carcass as shown in Figure 4 and it will be seen that tabs 36, 37, 38, and 39 slip into outer treads of the tire, thereby holding the piece in place while tabs 49 and 50 hold the display head in an elevated position. The several indicators are then located on the face of the tire with their appropriate sales messages correctly oriented with respect to the particular tread being described.

A modification of the device shown in Figure 3 consists in applying to a similarly formed transparent body indicators located on the body so as to over-print and outline areas which in turn will be oriented to register with specific tire treads when the device is mounted. The upper and lower edges of the piece can carry adhesive bands so that the device can be accurately attached to a tire.

What is claimed is:

1. An advertising display device for a pneumatic, vehicular tire comprising, a frame fabricated from flexible sheet material, said frame defining a substantially rectangular opening, a plurality of lateral indicating pointers mounted along one edge of the said frame, and extending into said opening, one side of said rectangular frame being formed as two adjacent pieces, which upon being superimposed cause one side of the said rectangle to assume an arcuate form whereby said pointers will be respectively in direct contact with the road engaging surface of said tire.

2. An apparatus in accordance with claim 1 in which the indicating pointers are mounted along that side of the rectangular opening which assumes the arcuate form.

PAUL E. HEAL.

References Cited in the file of this patent

UNITED STATES PATENTS

| Number | Name | Date |
|---|---|---|
| 1,553,585 | Anthony | Sept. 15, 1925 |
| 1,784,952 | Wolfson | Dec. 16, 1930 |
| 2,069,321 | McLaughlin | Feb. 2, 1937 |
| 2,490,496 | Williamson | Dec. 6, 1949 |